UNITED STATES PATENT OFFICE.

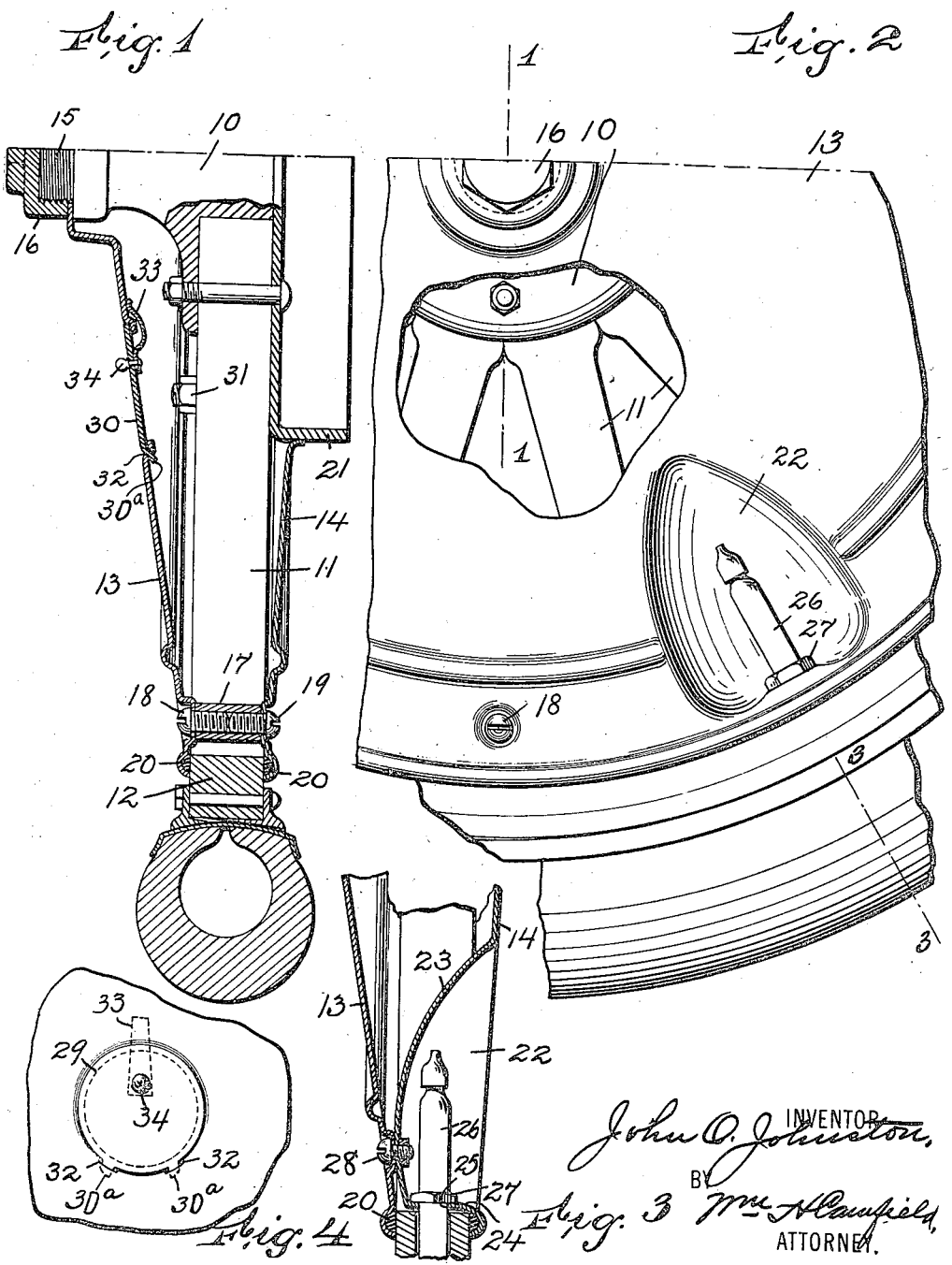

JOHN O. JOHNSTON, OF NEWARK, NEW JERSEY.

GUARD FOR WHEELS.

1,375,392.  Specification of Letters Patent.  Patented Apr. 19, 1921.

Application filed January 30, 1920. Serial No. 355,107.

*To all whom it may concern:*

Be it known that I, JOHN O. JOHNSTON, a citizen of the United States, and a resident of Newark, county of Essex, and State of New Jersey, have invented certain new and useful Improvements in Guards for Wheels, of which the following is a specification.

This invention relates to an improved guard for wheels, such as motorcycle and automobile wheels, and is designed to provide covers which are preferably made of sheet metal and in the form of disks which fit against the sides of the wheel and are securely held thereon against accidental displacement and also to prevent rattling.

The invention consists of a device of this kind in which the construction permits of a complete covering of the spokes and the hub of the wheel, and permits access to the valve of the tire without the necessity of removing any part of the guard.

Another object of the invention is to provide fastening means for the members of the guard, which fastening means consist of screws that are inserted through the members, and when tightly screwed into place they abut, thus acting to lock or bind the screws so that they do not retreat under the vibration to which wheels of this kind are subjected.

Another object of the invention is to provide an opening in the guard, which opening has a removable lid so that access can be had to the brake adjusting nut, so that the guard does not have to be removed for such adjustment.

It will thus be seen that I have devised a guard that can be attached to a wheel and not removed therefrom to either adjust the brake band or to inflate the tire, so that the guard is in the nature of a permanent cover for both sides of the wheel and ordinarily not removed unless repairing of the inner part of the wheel is necessary.

The invention is illustrated in the accompanying drawing, in which Figure 1 is a vertical section taken on line 1—1 in Fig. 2, showing half of a wheel equipped with the improved guard. Fig. 2 is a face view of a fragment of the lower half of a wheel partly broken away. Fig. 3 is a section of the lower half of the rim and part of the guard, taken on a plane represented by line 3—3 in Fig. 2, and Fig. 4 is a part of the guard showing in elevation a lid for the opening which permits access to the brake adjusting device.

In the drawing I show one-half of the rear wheel of an automobile, consisting of a hub portion 10 spokes 11 and the rim 12, and the particular guard illustrated is designed to fit the rear wheel but it will, of course be understood that changes in shape and dimension are made in guards for wheels that are applied to motorcycle and similar wheels, or to the front wheels of automobiles, where no allowance has to be made for the brake.

In the guard illustrated the member 13 is the outer member of the guard, and 14 is the inner member, these members being preferably made of sheet steel stamped to the proper dimension and shape, these disks being usually slightly dished, although they can be straight if desired. The two members of the guard are adapted to inclose the wheel between the hub and the rim, effectually shutting out water, dust and mud, the front plate being preferably perforated so that it goes over the stud 15 of the hub member and is fastened in place by the hub cap 16.

In order to secure the members together I perforate them at opposed points and insert a sleeve 17 opposite each pair of perforations, the sleeve 17 being screw-threaded on the inside and receiving screws 18 and 19, the heads of which bear against the outer sides of the members, and the inner ends of the screws abut, being made of the proper length so that they are very forcibly screwed together with a tight frictional contact on the ends, and at the same time the heads hold the guard members against the sleeve 17 without any play, the screws thereby being held against accidental displacement because the tendency to rotate to loosen the screw is prevented, as its binding contact on the other screw tends to screw that second screw more tightly into place.

I find that this means of securing the members is positive, there is no rattle and the members do not become displaced. The outer ends of the members are provided with annular grooves on their inner faces, these grooves receiving the rings 20 of rubber or similar resilient material, so that a water-tight joint at the edge is provided, and in addition, the metal is stiffened so that it does not become distorted and provide an uneven edge where it is closely adjacent to the rim.

The inner member 14 of the guard contacts with the hub member of the wheel, the hub member in the illustration shown being the brake member 21. It will thus be seen that the members of the guard are securely held in place, the screws 18 and 19 being arranged at desired intervals around the wheel, being usually placed in the alternate open spaces between the spokes, so that if a wheel has twelve spokes it would have six points at which it is securely held together near the rim, although the number of securing members can be varied to suit circumstances.

In those wheels that have a valve for the tire I provide one of the guard members, preferably the inner guard member, with a recess to receive the tire valve. In the form shown the recess 22 for the tire valve is provided by pressing the wall 23 of the inner member 14 so that it forms a recess with the bottom wall 24 provided with an opening 25 through which the tire valve 26 projects into the recess 22, so that the tire valve is accessible and a tire can be removed and installed without the removal of any parts of the guard. The nut 27 or any other desired means is used for holding the tire valve in its proper position, and also making a tight joint around the edge of the opening 25, and the wall 23 is secured to the member 13, the drawing showing a bolt 28 used for this purpose.

To still further make it unnecessary to remove the guards for ordinary adjustments or replacements on the wheel, I provide the outer members of the guards on rear wheels with an opening 29, which is provided with an inclosure in the shape of a lid 30, the lid 30 when it is removed giving access through the opening to the nut 31 or other means for adjusting the brake band. The brake band mechanism itself is not shown, since it is no part of the invention, and the location of the adjusting means is the only part thereof that is illustrated.

The lid 30 is removably held in place by the lips $30^a$ which project down through the slots 32 adjacent to the edge of the opening 29. The spring 33 is secured to the back of the lid and bears on the back of the member 13, the spring extending back on the lid a material distance so that when the handle 34 is pulled up against the tension of the spring 33, the lid can be raised high enough to permit the fingers $30^a$ to be withdrawn from the slots 32, and then the lid can be removed by a downward and outward movement, as will be evident.

I claim:

1. A guard for wheels comprising members fitting against the sides of the wheel, one of the members having an opening adjacent to the brake band of the wheel, the member having slits at the edge of the opening, a lid for the opening, lips on the lid and adapted to project into the slits, and a spring on the lid and bearing against the inside of the member.

2. A guard for wheels comprising members covering the sides of the wheel inside the rim, a threaded sleeve between the members, and screws with their heads holding the members against separation, the ends of the screws abutting within the sleeve.

In testimony that I claim the foregoing, I have hereto set my hand, this 28th day of January, 1920.

JOHN O. JOHNSTON.